United States Patent
Stankewitz

(10) Patent No.: US 6,538,809 B1
(45) Date of Patent: Mar. 25, 2003

(54) VARIABLE EPI-ILLUMINATION INTERFERENCE ATTACHMENT

(75) Inventor: Hans-Werner Stankewitz, Wetzlar (DE)

(73) Assignee: Leica Microsystems Wetzlar GmbH, Wetzlar (DE)

( * ) Notice: Subject to any disclaimer, the term of this patent is extended or adjusted under 35 U.S.C. 154(b) by 0 days.

(21) Appl. No.: 08/232,362

(22) Filed: Apr. 25, 1994

Related U.S. Application Data

(63) Continuation-in-part of application No. PCT/DE93/00866, filed on Sep. 15, 1993.

(30) Foreign Application Priority Data

Sep. 17, 1992 (DE) .............................................. 4231069

(51) Int. Cl.⁷ .............................................. G02B 21/00
(52) U.S. Cl. ...................... 359/370; 359/387; 359/389; 359/390
(58) Field of Search ................................ 359/385, 387, 359/389, 390, 391, 370, 798, 583; 362/257, 317; 356/346, 349, 360, 356; 250/548, 492.2

(56) References Cited

U.S. PATENT DOCUMENTS

| | | | | |
|---|---|---|---|---|
| 4,639,139 A | * | 1/1987 | Wyant et al. | 356/360 |
| 4,656,347 A | * | 4/1987 | Une et al. | 250/201 |
| 4,948,253 A | * | 8/1990 | Biegen | 356/360 |
| 5,159,408 A | * | 10/1992 | Waldenmaier et al. | 356/360 |
| 5,208,451 A | * | 5/1993 | Deck | 356/356 |
| 5,418,030 A | * | 5/1995 | Tominaga et al. | 428/64 |
| 5,450,752 A | * | 9/1995 | White et al. | 73/643 |

FOREIGN PATENT DOCUMENTS

| | | | |
|---|---|---|---|
| DE | 2182170 | 5/1987 | |
| DE | 3627185 | 5/1987 | |
| JP | 311201 | * 12/1988 | 359/583 |
| JP | 3931919 | * 7/1990 | 359/385 |
| JP | 403279825 | * 12/1991 | 356/346 |
| JP | 403285147 | * 12/1991 | 356/346 |
| WO | 9105218 | 4/1991 | |

OTHER PUBLICATIONS

Nakumura, Projection Inspecting Machine, Dec. 27, 1984, vol. 8 No. 286 (P–324).*
Kraft, Optical Illuminator, Oct. 7, 1971, DP No. 2021654.*
Spiller et al, Interferometric Complex Filter, Jan. 1974, vol. 16, No. 8.*
K. Mutze et al, "ABC der Optik", Werner Dausien Verlag, 1972, pp. 401–404.

* cited by examiner

*Primary Examiner*—Mohammad Sikder
(74) *Attorney, Agent, or Firm*—Simpson & Simpson, PLLC

(57) ABSTRACT

An epi-illumination interference attachment according to Mirau that can be mounted onto the objective (1) of a microscope as a two-ray interference attachment module (12). The attachment has a reference mirror (6) and several beam splitters (8a–8d) which are affixed on a carrier such as turret plate (7). The beam splitters (8a–8d) show specific reflection/transmission characteristics (R/T values), especially 20/80, 35/65, 43/57, and 50/50. The reference mirror (6) shows, for instance a reflection value of 85 percent. With the installation according to this invention, objects (4) with very different reflection values can be observed and measured without any contrast problems.

12 Claims, 2 Drawing Sheets

VARIABLE EPI-ILLUMINATION INTERFERENCE ATTACHMENT

Figure 1:
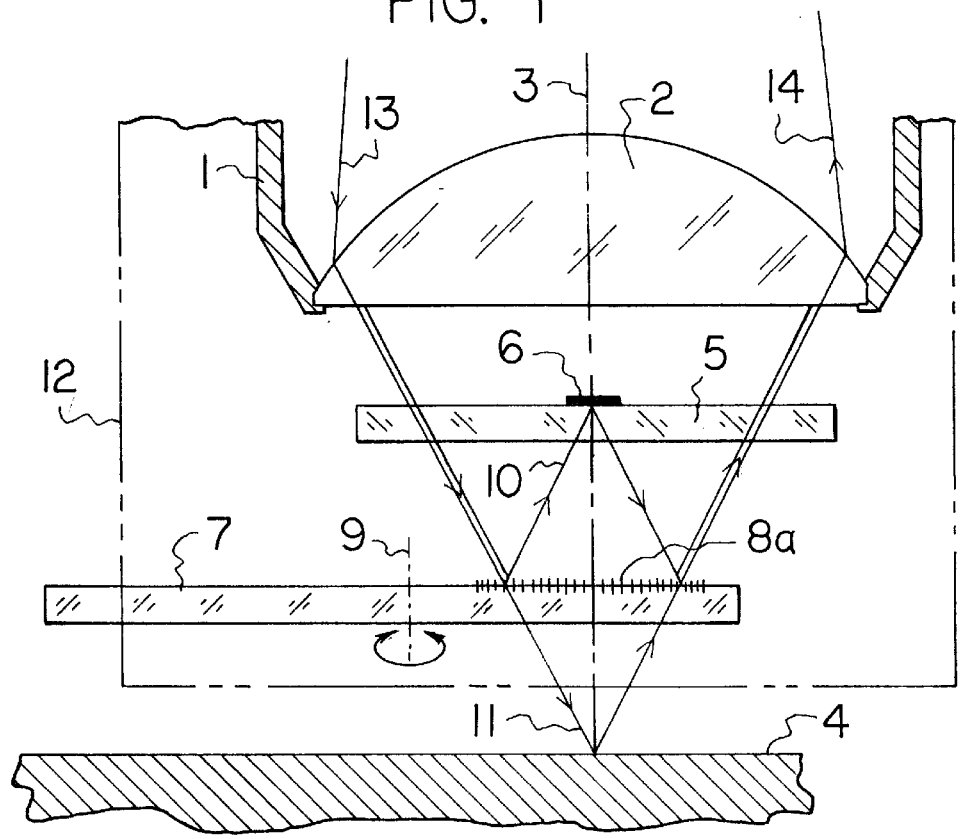

This application is a continuation-in-part of international application PCT/DE93/00866 designating the United States, filed Sep. 15, 1993, which claims priority under 35 U.S.C. §119 of German application DE P 42 31 069.5, filed Sep. 17, 1992.

BACKGROUND OF THE INVENTION

The invention pertains to a variable epi-illumination interference attachment according to Mirau for observation and measurement of object surfaces. Among the interference microscopy procedures that produce information on the micro structure of objects by utilizing the appearances of light interference patterns are the multi-ray interference equipment according to Tolansky as well as two-ray interference installations according to Michelson or Mirau.

An epi-illumination interference microscope according to Mirau is known from K. Müze's *ABC der Optik*, published by Werner Dausien, Hanau 1960, pages 400 and 401 (compare page 401, right column, in connection with FIG. 2). The design of this epi-illumination interference microscope contains a beam splitter between the front lens of an epi-illumination objective and the object to be examined. Furthermore, the side of the front lens facing the object has a mirrored spot in its central area. In this known arrangement, the incident illumination light is split into two parts at the beam splitter arranged orthogonally to the microscope's axis. One part, an object beam, falls upon the object after passing through the beam splitter, is reflected there, and again passes through the beam splitter in order to finally re-enter the front lens of the objective. The other part, a reference beam, is reflected at the beam splitter, comes upon the mirrored spot, is subsequently reflected back onto the beam splitter and, after yet another reflection at the beam splitter, interferes with the object beam.

The disadvantage of this familiar set up consists, among others, in the fact that the objects to be examined can show reflection values that vary within wide margins. If, for instance, an object with a reflection value of only five percent is to be measured (e.g. a coal sample), one may encounter contrast problems, because the metallically reflecting mirrored spot shows, compared to the weakly reflecting coal sample, a very high reflection value. Contrast problems arise when the relative brightness between the reference beam and object beam is unbalanced, causing one beam to wash out the other, regardless of whether the beams interfere in a constructive or destructive relationship. If one beam is extremely bright and the other beam is extremely dim, the observer will be unable to determine whether the beams are interfering constructively or destructively.

SUMMARY OF THE INVENTION AND DRAWINGS

It is thus the object of this invention to provide an epi-illuminating interference attachment with which surfaces of objects with very different reflection values can be observed and measured without any contrast problems. This particular interference attachment may thus be used without limitation for practically all objects in question. This invention accomplishes this. object regarding an interference attachment of the above mentioned type in part by attaching several beam splitters to a carrier. These beam splitters distinguish themselves definitively in their respective reflection/transmission characteristics. Depending on the reflection value of the object to be examined, a selected one of these beam splitters may be moved into working position. This object of the invention is also accomplished in part by providing exchangeable reference mirrors having distinct reflection values for selective inclusion into the attachment.

Additional suitable designs result from the claims below.

The invention is illustrated more closely in FIGS. 1 through 4. They show:

FIG. 1: a schematic depiction of this invention's epi-illumination interference attachment in vertical cross-section.

Figure 2:
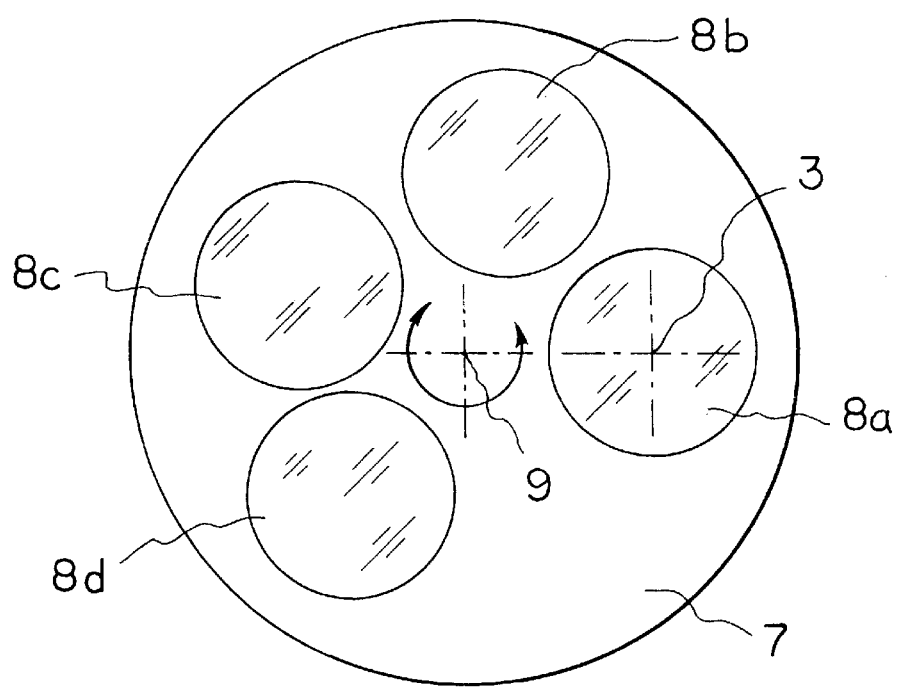

FIG. 2: a top view onto the turret plate that carries the different beam splitters.

Figure 3:
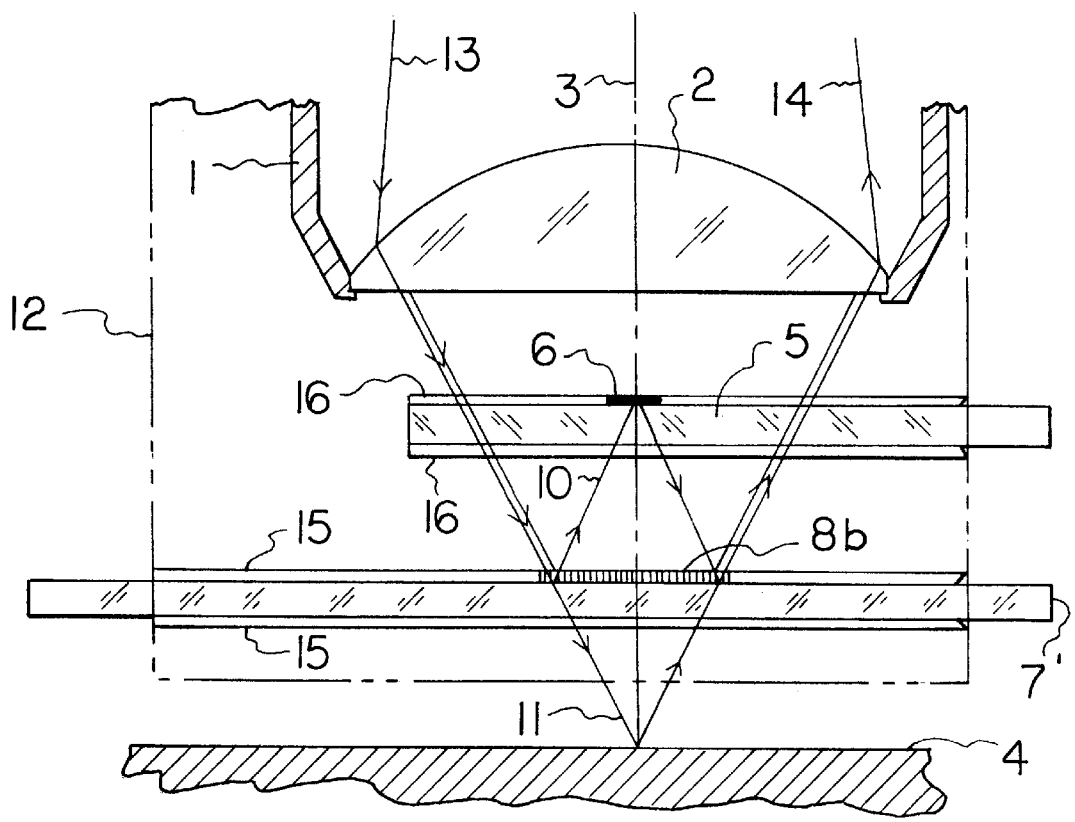

FIG. 3: a view similar to that of FIG. 1 illustrating an alternative embodiment of the present invention wherein a slide is used to carry a plurality of beam splitters.

Figure 4:
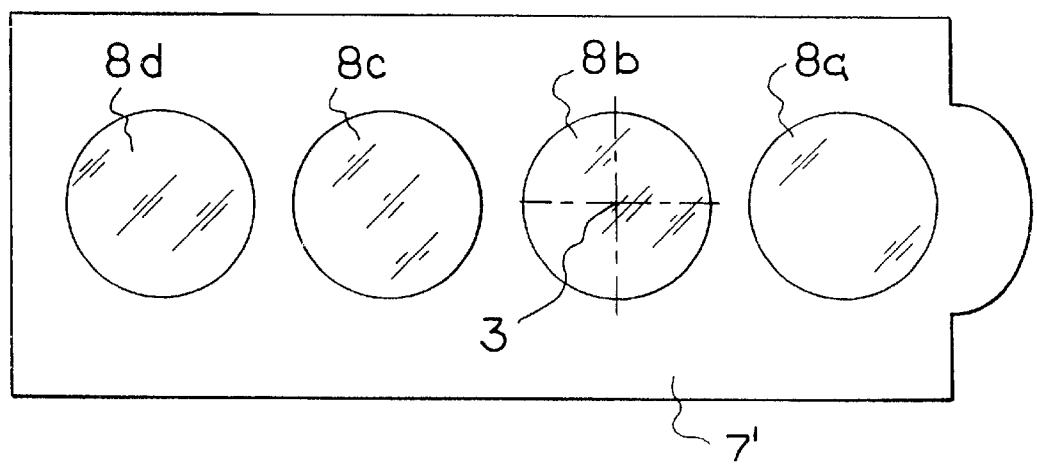

FIG. 4: a top view onto the slide that carries the different beam splitters.

DETAILED DESCRIPTION

FIG. 1 shows the front lens (2) of an objective (1), of a microscope that's not depicted. Its optical axis (3) is at the same time the optical axis of the interference attachment according to this invention. A glass plate (5) is arranged orthogonally to the optical axis (3). A reference mirror (6) is located on that side of the glass plate (5) that faces the objective (1). The reference mirror (6) is a metallic, reflective, centrally-positioned coating that can for instance be evaporated onto the glass plate. A turret plate (7), made for instance, out of glass, is located in between the glass plate (5) and the object (4). Its axis of rotation (9) runs parallel to the optical axis (3), but is lateral to it. The turret plate contains, as depicted in FIG. 2, four beam splitters (8a–8d) that can be moved into working position if selected, that is, into alignment with the optical axis. The turret plate (7) carries the four beam splitters, of which, for instance, beam splitter (8a) has a reflection/transmission (R/T) relationship of 20/80, beam splitter (8b) an R/T relationship of 35/65, beam splitter (8c) an R/T relationship of 43/57, and beam splitter (8d) an R/T relationship of 50/50. It is of course also possible to attach additional beam splitters with specific R/T characteristics onto the turret plate (7). Also, as an alternative to turret plate (7), a transparent slide (7') as shown in FIGS. 3 and 4 may be used to carry a plurality of beam splitters (8a–8d). Slide (7') may be supported between opposing pairs of parallel slide supports (15) provided in an attachment module housing (12) to allow for manual or possibly automatic positioning of a selected beam splitter having a desired R/T ratio along axis (3).

The glass plate (5) and the turret plate (7) are suitably provided in housing (12) as part of the attachment module. The turret plate (7) can be mounted in such a way that its peripheral area protrudes. slightly from the attachment module housing (12), so that the operator may turn it manually. Naturally, automatic turning devices are also possible.

The function of the attachment according to this invention is the following: an illumination beam (13). passes through the glass plate (5) after leaving the front lens (2) and is split into two parts at beam splitter (8a). One beam part is reflected and arrives as the reference ray (10) at the reference mirror (6) after passing through glass plate (5), is reflected back toward beam splitter (8a), and from there again is redirected toward the glass plate (5). This path of the reference ray is marked by the corresponding arrows in FIG. 1. The other beam part passes through beam splitter (8a) and arrives at the surface of the object (4) as the object ray (11), after leaving the turret plate (7), which is made out of transparent materials. From there it joins with reference ray (10) for interference therewith, after having been reflected from the object (4) and transmitted through turret plate (7) and beam splitter (8a). Both beam parts (10 and 11) arrive after passing through objective (1) as beam (14) at the observation or measuring image plane of the microscope.

Because there are objects with extremely different reflection values, the reflection value of the reference mirror (6) ought to be designed in such a flexible way that it can be adjusted ideally to the condition of the object to be examined, in order to avoid the otherwise created contrast problems. This means that both beam parts (10 and 11) ought to ideally be of the same brightness in order to arrive at an optimal contrast. This is partly achieved in this invention in the following way: the ideal adjustment to the respective degree of reflection of the microscopic object with the help of the turret plate (7) is accomplished by moving a selected beam splitter (8a, 8b, 8c or 8d) that shows the most optimal R/T characteristic for the object to be measured into working position. Through such an adjustment to the reflection value of the objects to be examined, by utilizing the turret plate, a higher sample and image brightness is achieved, especially in dark objects (very weak reflection value). It is thus possible, for instance, to increase the brightness by a factor of two to three in an object with a reflection value of only five percent.

It has proven advantageous to choose a beam splitter with an R/T relationship of 20/80 for objects that show a reflection value around 5 percent, for instance, a coal sample or a glass plate. In crystal samples that show, for instance a reflection value around 25 percent, a beam splitter with an R/T relationship of 35/65 is suitable. Semi-conducting materials with a reflection value of 50 percent should be examined with a beam splitter which shows an R/T relationship of 43/57. Metallic objects, for instance an aluminum mirror with a reflection value of around 85 percent should best be examined with a beam splitter with an R/T relationship of 50/50. Beyond this, it is of course possible to install additional beam splitters with specific R/T characteristics.

In an especially suitable design of this invention, the reference mirror (6) on the glass plate (5) should preferably have a reflection value of 85 percent. Here too modifications are possible. The glass plate (5) for instance, may be clipped or supported exchangeably on support ribs (16) in the attachment module housing (12), as shown in FIG. 3, so that it may be exchanged for another glass plate that contains a reference mirror with a different reflection value or another geometric shape. Although reference mirrors are usually circular, they can be other shapes such as oval or rectangular. It is also possible that the reference mirror (6) contains focussing marks which could have the form of small-format linear windows within the metallic mirror coating.

The interference attachment according to Mirau can be detachably mounted in the familiar way to the objective of a microscope through a screw thread or a bayonet joint. With the equipment according to this invention it is possible to expand the scope of utilization of conventional microscopes regarding measurement of a broader variety of specimens. This principle can also be used in an interference microscope according to Mirau.

What is claimed is:

1. A variable epi-illumination interference module for selective attachment to a microscope objective, said module having a reference mirror and a beam splitter, said beam splitter being positioned on an optical axis between said reference mirror and an object, the improvement comprising carrier means for supporting a plurality of beam splitters and selectively positioning one of said plurality on said optical axis, each of said plurality having a different reflection/transmission ratio, whereby objects having different reflective values may be examined.

2. The interference module according to claim 1, wherein said means is a turret.

3. The interference module according to claim 1, wherein said means is a slide.

4. The interference module according to claim 2, wherein said turret supports at least four beam splitters with respective reflection/transmission ratios of 20/80, 35/65, 43/57 and 50/50.

5. The interference module according to claim 3, wherein said slide supports at least four beam splitters with respective reflection/transmission ratios of 20/80, 35/65, 43/57 and 50/50.

6. The interference module according to claim 1, wherein said reference mirror is applied to one side of a glass plate, said side facing said objective and said mirror having a reflective value of about 85% toward said objective.

7. The interference module according to claim 1, wherein said reference mirror includes focussing marks.

8. A variable interference module for selective attachment to a microscope objective, said module comprising, a housing, an axis passing through said housing coincident with an optical axis of said objective, a reference mirror on one side of a glass plate, said glass plate being located within said housing with said reference mirror positioned on said axis, carrier means located within said housing for supporting a plurality of beam splitters and selectively positioning one of said plurality on said axis, each of said plurality having a different reflection/transmission ratio, said carrier means extending through said housing for selecting said one of said plurality of beam splitters.

9. A module according to claim 8 wherein said reference mirror is removable.

10. A module according to claim 9, wherein said reference mirror is exchangeable with a plurality of other reference mirrors each having a different reflective value.

11. A module according to claim 9, wherein said reference mirror is exchangeable with a plurality of other reference mirrors each having a different geometric size.

12. A variable epi-illumination interference module for selective attachment to a microscope objective, said module comprising:

a housing;

an axis passing through said housing coincident with an optical axis of said objective;

a reference mirror supported on a transparent plate within said housing, said reference mirror being positioned on said axis; and means supported by said housing between said reference mirror and an object to be observed for separating an illumination beam passing through said objective into a reference beam incident upon said reference mirror and an object beam incident upon said object, said means being selectively adjustable to change the relative intensity of said reference beam and object beam.

* * * * *

UNITED STATES PATENT AND TRADEMARK OFFICE
CERTIFICATE OF CORRECTION

PATENT NO. : 6,538,809 B1
DATED : March 25, 2003
INVENTOR(S) : Stankewitz, Hans-Werner It is certified that error appears in the above-identified patent and that said Letters Patent is hereby corrected as shown below:

Column 1,
Line 63, please delete the extraneous period

Column 2,
Line 55, please delete the extraneous period

Signed and Sealed this

Sixth Day of May, 2003

JAMES E. ROGAN
*Director of the United States Patent and Trademark Office*